(12) United States Patent
Daoud

(10) Patent No.: US 6,220,554 B1
(45) Date of Patent: Apr. 24, 2001

(54) WIRE CLIP

(75) Inventor: Bassel H. Daoud, Parsippany, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/108,335

(22) Filed: Jun. 30, 1998

(51) Int. Cl.⁷ .................................................. F16L 3/08
(52) U.S. Cl. ........................... 248/74.1; 24/16 PB; 248/73
(58) Field of Search ................... 248/74.1, 74.2, 248/74.3, 74.4, 74.5, 316.1, 316.6, 316.3; 24/16 PB, 17 AP, 543; 439/828

(56) References Cited

U.S. PATENT DOCUMENTS

| | | | |
|---|---|---|---|
| 466,932 | * | 1/1892 | Cornell ................................ 248/74.2 |
| 1,622,632 | * | 3/1927 | Fahnestock ......................... 248/74.2 |
| 3,659,319 | * | 5/1972 | Erickson ............................. 24/73 AP |
| 3,991,960 | * | 11/1976 | Tanaka ................................... 248/68 |
| 4,023,758 | * | 5/1977 | Yuda .................................... 248/73 |
| 4,195,807 | * | 4/1980 | Llauge ................................. 248/74.2 |
| 4,470,179 | * | 9/1984 | Gollin et al. .......................... 24/543 |
| 4,840,334 | * | 6/1989 | Kikuchi ................................. 248/73 |
| 4,917,340 | * | 4/1990 | Juemann et al. .................... 248/74.2 |

* cited by examiner

Primary Examiner—Ramon O. Ramirez
Assistant Examiner—Anita M. King
(74) Attorney, Agent, or Firm—Synnestvedt & Lechner LLP

(57) ABSTRACT

A wire clip having resilient cantilevered tines which move in a cooperating manner to permit a wire to pass therethrough. The wire clip includes a base and first and second arms connected to and extending from the base. The first and second arms have distal ends which form the resilient tines. Wires must be manually maneuvered through the tines to be inserted into the clip. The tines will not inadvertently release a wire from the clip.

19 Claims, 2 Drawing Sheets

WIRE CLIP

BACKGROUND

The present invention relates to clips and other such devices for retaining wires.

Many types of clips and related devices are known for retaining and bundling wires, wire bundles, cables and the like. Examples of such clips are shown in U.S. Pat. Nos. 4,563,163 and 4,455,715. Such clips typically clamp around the wires to securely hold them in place.

Some applications require retaining clips that permit easy addition and removal of individual wires. For example, many Building Entrance Panels (BEPs), used with telecommunications equipment, use clips fixed to the BEP at various points to retain and bundle the myriad of wires within. Such clips do not tightly clamp around the wires, but form an enclosed loop-like passage which loosely retains the wires. One such clip device has two flexible arms having ends that overlap one another, one on top of the other, with space in between the two arms. Wires can be easily inserted into the clip through the flexible arms without disturbing the other wires. The arms of these known clips, however, can inadvertently release wires.

For example, when servicing telephone equipment, service personnel may need to trace and pull on various wires. Pulling on a wire in one location can cause the wire to pull against the arms of a clip in another location such as within a BEP. Unbeknownst to the service person, the pulled wire can be pulled through the arms of the clip. Once loose, the wire may move to a position where it may be severed or where it can cause damage to other items.

Accordingly, one object of the present invention is to provide a wire-retaining clip which allows for the addition of wires, but which has a reduced tendency to inadvertently release wires.

Another object of the invention is to provide a retaining clip that is inexpensive to produce.

Additional objects, advantages and novel features of the invention will be set forth in part in the description that follows, and in part will become apparent to those of ordinary skill in the art upon review of the following or maybe learn by practice of the invention.

SUMMARY OF THE INVENTION

In broad terms, the object and the advantages of the present invention can be attained by providing a wire clip having a base, and first and second arms connected to and extending from the base. Each of the first and second arms have a distal end. The first and second arms are shaped to form an enclosed passage bounded by the base and the arms in which the wire is retained. Forming the distal end of the first arm is a first resilient cantilevered tine. The first tine extends towards the second arm and has a movable free end. Forming the distal end of the second arm is a second resilient cantilevered tine which has a movable free end. The second tine extends towards the first arm in a side-by-side overlapping relationship to the first tine and is movable in cooperation with the first tine to permit the wire to pass through the first and second tines.

In one particular embodiment, the distal end of the second arm further includes a third resilient cantilever tine which has a movable free end. This third tine is spaced from the second tine, and the first tine extends between the second and the third tines. Here, the first, second and third tines are movable in a cooperating manner to permit the wire to pass therethrough.

DETAILED DESCRIPTION OF THE DRAWINGS

DETAILED DESCRIPTION OF PREFERRED EMBODIMENTS

FIGS. 1 to 4 show a clip 10 for retaining telephone wire. The invention may be used with other types of wires such as wire bundles, cable, fiber optic cables, and the like.

The clip 10 has a base 12 on a side of the clip 10 designated the bottom for orientation and reference purposes for describing the present drawings. A snap fitting 14 suitable for use with sheet metal is illustrated. Other means for fastening the clip 10 to a structure may be used, such as other types of snaps, screws, adhesives, etc., with corresponding modification to the base 12.

Figure 1:
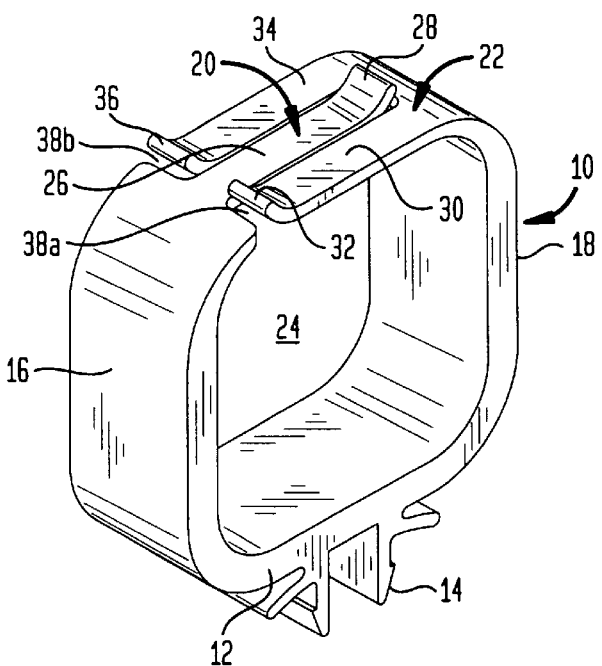
FIG. 1 is a perspective view, looking downward, of a wire clip in accordance with the present invention.
Figure 2:
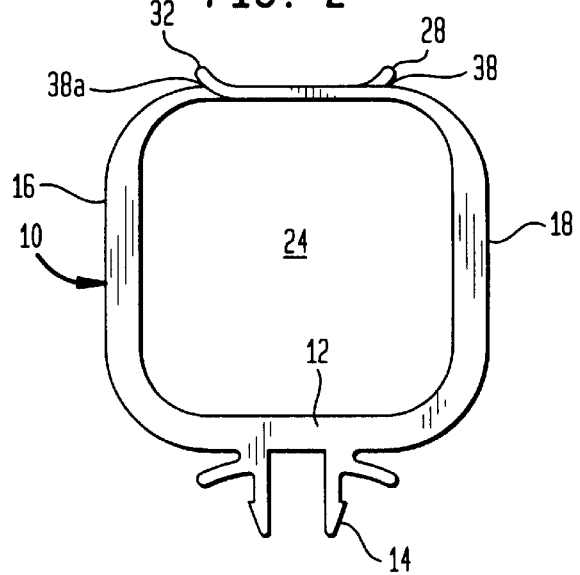
FIG. 2 is a side view of the wire clip shown in FIG. 1.

Connecting to and extending upward from opposite sides of the base 12 are first and second arms 16 and 18. Each of the arms, 16, 18 has a distal end 20, 22, respectively, positioned on the top side of the clip 10 opposite the base 12. As best seen in FIGS. 1 and 2, the first and second arms 16, 18 are shaped to form an enclosed passage 24 bound by the arms 16, 18 and the base 12 for retaining the wires. The arms 16, 18 of the present invention are similar in length and shape and form the square-shaped clip 10 as shown, it being recognized that the clip 10 may take on other symmetries and shapes.

Figure 3:
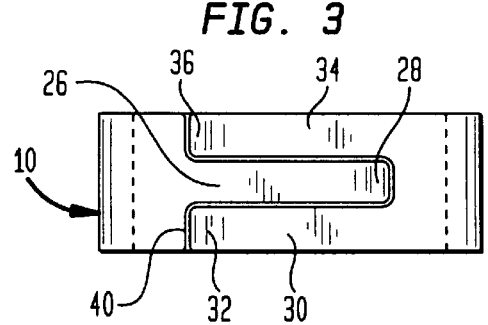
FIG. 3 is a top view of the wire clip shown in FIG. 1.
Figure 4:
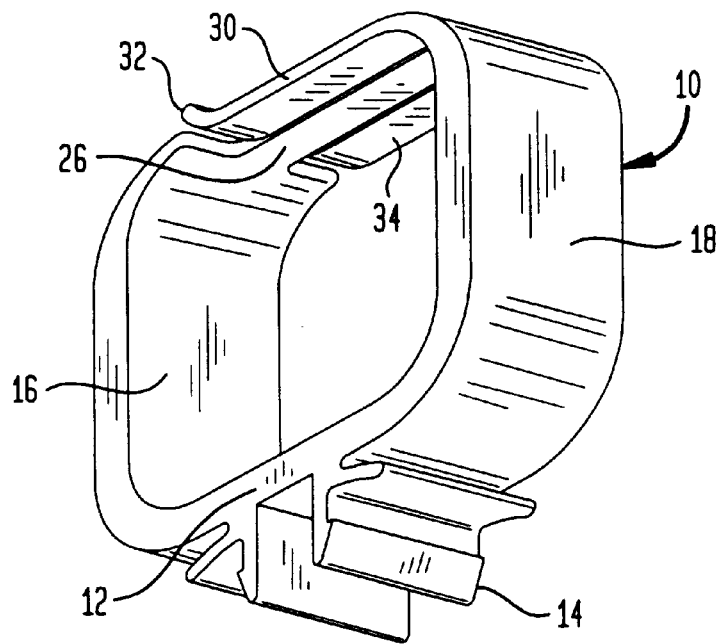
FIG. 4 is a perspective view looking upwards from below of the wire clip shown in FIG. 1.

Forming the distal end 20 of the first arm 16 on the upper section of the clip is a first resilient cantilevered tine 26. As seen in FIGS. 1 and 3, the tine 26 extends towards the second arm 18 and has a free end 28 movable towards and away from the enclosed passage 24 (up and down in the illustrated embodiment). The tine 26 is resilient such that it can spring back to its initial position after being moved as further described below.

Also on the upper section of the clip 10 is a second resilient cantilevered tine 30 forming the distal end 22 of the second arm 18 and which has a free end 32 movable towards and away from the enclosed passage 24. As seen in FIGS. 1 and 3, the second tine 30 extends opposite the first tine 26 towards the first arm 16 in a substantially side-by-side overlapping relationship with the first tine 26.

The distal end 22 of the illustrated embodiment is further defined by a third resilient cantilevered tine 34 also having a free end 36 movable towards and away from the enclosed passage 24. As seen in FIGS. 1, 2 and 3, the third tine 34 is spaced from and extends substantially parallel to the second tine 30. The first tine 26 extends between the second and third tines 30 and 34 in the spacing between them. All three tines 26, 30 and 34 are substantially parallel in the preferred embodiment.

In order to insert wires into the enclosed passage 24, the first, second, and third tines 26, 30, and 34 are movable in a cooperating manner to permit the wire to pass through the tines. With reference to FIGS. 1 and 2 it is seen that the free ends 28, 32 and 36 of the respective tine 26, 30 and 34 are flared away from the enclosed passage 24, thereby forming a "V" shape in conjunction with an adjacent arm. For example, the flared free end 28 of the tine 26 forms a "V" shape 38 in conjunction with the adjacent arms 30 and 34 (see FIG. 2); the flared free end 32 of the arm 30 forms a "V" shape 38a in conjunction with the adjacent arm 26; the flared end 36 of the tine 34 forms a "V" shape 38b in conjunction with the arm 26.

To insert a wire into the clip 10, an end of the wire can be inserted perpendicularly to the clip 10 through the enclosed passage 24. If the wire has already been run such that the wire end cannot be inserted, the wire can be maneuvered through the tines. A section of wire is inserted perpendicularly into the "V" shaped areas 38a and 38b such that the wire is under the second and third (outside) tines 30 and 34, and above the first (middle) tine 26. As the wire is further maneuvered toward the right with reference to FIGS. 1, 2 and 3, the outside tines 30 and 34 move upward, and the middle tine 26 moves downward. As the wire reaches the end 28 of the tine 26, the end 28 moves into the enclosed passage 24 below the distal end 22 of the arm 18 allowing the wire into the enclosed passage 24. Once the wire passes through, the three tines 26, 30, 34 resiliently return to their initial position as shown in FIGS. 1 to 4. It is to be appreciated that once within the clip 10, a wire is not likely to be inadvertently released even if there is pulling on the wire. Rather, a wire can be released only by maneuvering the wire in a reverse manner as described above for insertion. Moreover, because there are no "V" shapes for the wire to grab from within the enclosed passage 24, the tines must be maneuvered physically and set to a position for releasing the wire; e.g., pushing the free end 28 of tine 26 into the enclosed passage 24 a suitable distance to allow the wire to pass over the tine 26.

It is readily recognized that wires can be inserted from either side of the clip 10, from the left side (with reference to FIG. 1) as described above, or from the right side under the first (middle) tine 26 and over the second and third (outer) tines 30 and 34. Wires can be removed from the clip from either side as well.

The flared ends forming the "V" shapes 38, 38a and 38b guide and ease the insertion of the wire into the tines. Without the flared ends, the tines should be maneuvered manually to create the "V" shape for insertion. The ends are flared a suitable amount to accommodate the gauge of the wire anticipated. For example, clips for telephone wires can have a small flare, while clips for use with larger gauge wire should have a larger flare.

A suitable gap 40 between adjacent tines and arms allows the individual tines to move inward and outward as necessary for wire insertion and removal. The gap 40 should preferably be minimized.

The clip 10 is preferably formed or molded as a unitary integral item from resilient material such as polycarbonate or other such suitable plastic. Other materials and construction which provide resilient tines may be used. The arms of the illustrated embodiments are substantially flat rectilinear sections.

Figure 5:
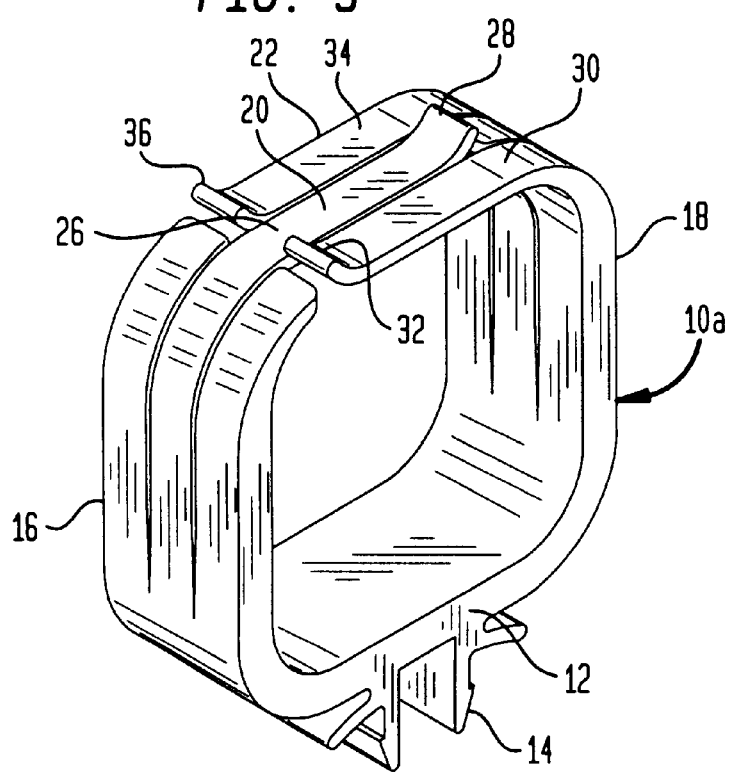
FIG. 5 is a perspective view of another embodiment of a wire clip in accordance with the present invention.

A second embodiment for a clip 10a is illustrated in FIG. 5. The clip is similar in construction and form with like reference numbers denoting like elements. Here the tines 26, 30 and 34 are much longer, forming a larger portion of their respective arms, and extending from a position substantially close to the base 12 as shown. This construction may make the tines more flexible for easier movement when inserting and removing wires.

While not specifically shown, FIG. 5 is helpful in illustrating an alternative method of forming the clip 10 or 10a. Three identical individual thin sections, each having a single tine, can be glued to one another, side-by-side, in a manner reversing the direction of the tines from one section to another.

It is seen that the present invention provides a novel wire clip that requires manual manipulation of the wire for insertion and removal into the clip but which prevents inadvertent releasing of the wires. Thus, the invention an elegant and inexpensive solution to a previous problem.

The foregoing description is intended to describe the invention by illustration of preferred embodiments. The illustrations are not intended to limit the invention in any way, which is to be limited by the appended claims only.

What is claimed is:

1. A wire clip for retaining wire, comprising:
   a base;
   first and second arms connected to and extending from said base, each of said first and second arms having a distal end, said first and second arms being shaped to form an enclosed passage bounded by said base and said first and second arms for retaining the wire;
   a first resilient cantilevered tine forming said distal end of said first arm, said first tine extending towards said second arm and having a movable free end;
   second and third resilient cantilevered tines forming said distal end of said second arm, said second and third tines being spaced from one another, said second and third tines extending towards said first arm and each of said second and third tines having a movable free end, said first tine extending between said second and said third tines, and said first, second and third tines being movable in a cooperating manner to permit multiple wires to pass there through; and
   said clip being integrally formed from plastic.

2. The wire clip in accordance with claim 1 wherein said free end of at least one of said tines is flared away from said enclosed passage.

3. The wire clip in accordance with claim 1 wherein said free end of each of said tines is flared away from said enclosed passage.

4. The wire clip in accordance with claim 1 wherein said first, second, and third resilient tines are positioned on a side of said clip opposite of said base.

5. The wire clip in accordance with claim 4 wherein said clip is substantially square shaped.

6. The wire clip in accordance with claim 5 wherein each of said first and second arms comprises a substantially flat rectilinear strip of plastic.

7. The wire clip in accordance with claim 1 wherein said base is shaped to be snap fastened to sheet metal.

8. The wire clip in accordance with claim 1 wherein at least one of said tines extends from a position substantially close to said base.

9. The wire clip in accordance with claim 1 wherein said third tine is substantially parallel to said second tine.

10. A wire clip for retaining wire, comprising:
    a base;
    a first arm connected to and extending from said base, said first arm having a distal end;
    a second arm connected to and extending from said base, said second arm having a distal end, and said first and second arms being shaped to form an enclosed passage bounded by said base and said first and second arms for retaining the wire;
    said distal end of said first arm having a resilient cantilevered tine extending towards said second arm, said first tine having a movable free end; and said distal end of said second arm having second and third resilient cantilevered tines spaced from one another, each of said second and third tines having a movable free end, said first tine extending between said second and said third tines, and said first, second and third tines being movable in a cooperating manner to permit multiple wires to pass therethrough.

11. The wire clip in accordance with claim 10 wherein said free end of at least one of said tines is flared away from said enclosed passage.

12. The wire clip in accordance with claim 10 wherein said free ends of each of said tines is flared away from said enclosed passage.

13. The wire clip in accordance with claim 10 wherein said clip is integrally formed from plastic.

14. The wire clip in accordance with claim 10 wherein said base includes means for fastening said clip to another structure.

15. The wire clip in accordance with claim 10 wherein said first, second, and third tines are substantially parallel to one another.

16. The wire clip in accordance with claim 10 wherein said tines are positioned on a side of said clip opposite from said base. said third tines, and said first, second and third tines being movable in a cooperating manner to permit the wires to pass there through.

17. An integral plastic wire clip for retaining multiple wires, comprising:

a base;

first and second arms integrally connected to and extending from said base, each of said first and second arms having a distal end, said first and second arms being shaped to form an enclosed passage bounded by said base and said first and second arms for retaining the wires;

a first resilient cantilevered tine forming said distal end of said first arm, said first tine extending towards said second arm and having a movable free end; and second and third resilient cantilevered tines forming said distal end of said second arm, said second and third tines being spaced from one another, said second and third tines extending towards said first arm and each of said second and third tines having a movable free end, said first tine extending between said second and said third tines, and said first, second and third tines being movable in a cooperating manner to permit said multiple wires to pass there through.

18. The wire clip of claim 17 wherein said first, second, and third tines are substantially parallel to one another and on a side of said clip opposite from said base.

19. The wire clips of claim 18 wherein said free ends of each of said tines is flared away from said enclosed passage.

* * * * *